3,039,342
CUT-OFF MECHANISM
Hubert J. Parsons, Horseheads, and Norman L. Hall, Elmira, N.Y., assignors to Hardinge Brothers, Inc., Elmira, N.Y.
Filed July 30, 1957, Ser. No. 675,104
1 Claim. (Cl. 82—100)

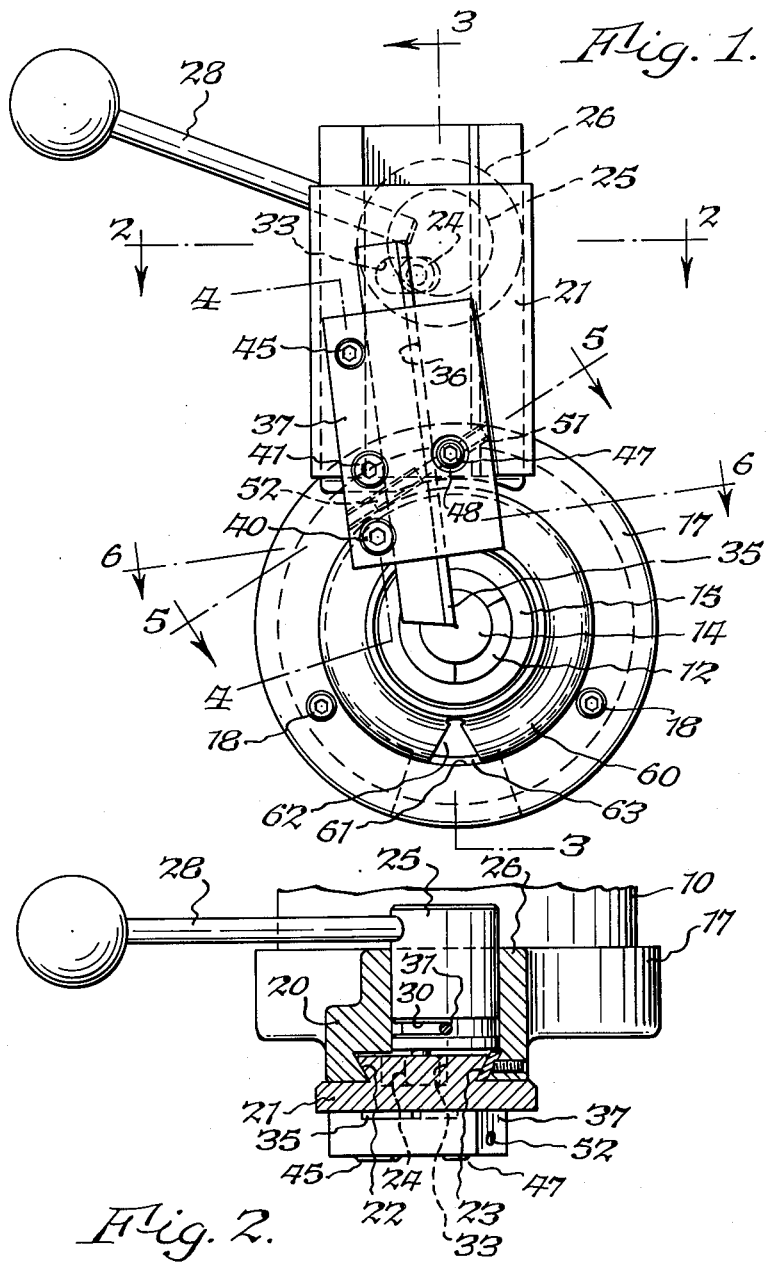

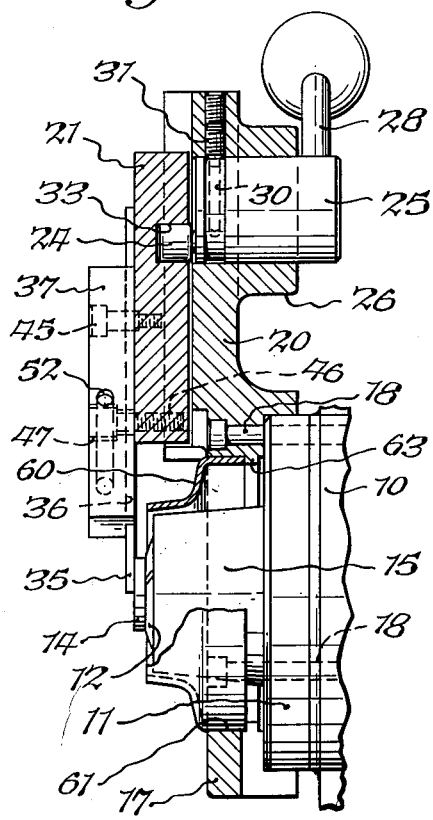
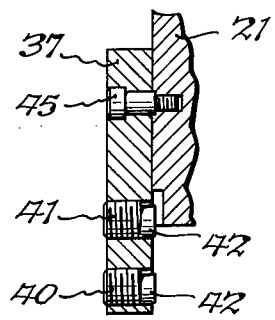
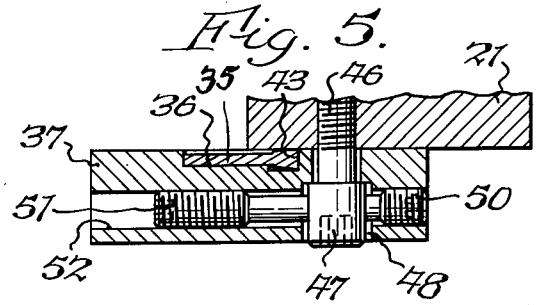
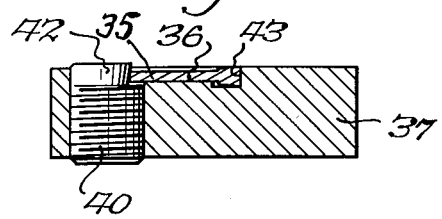

This invention relates to improvements in mechanisms for cutting off workpieces from a rod or bar while the same is rotating in a lathe or other machine.

One of the objects of this invention is to provide a cut-off mechanism which is so constructed that the tool which effects the cutting is firmly and rigidly held so as to provide a true and accurate cut. Another object is to provide a mechanism of this kind which may be mounted on a lathe as to leave the bed of the lathe free and unobstructed for use by other tools which may be required to operate on the work. It is also an object to provide a cut-off tool which may be readily adjusted for positioning the cutting tool correctly with reference to the axis of rotation of the work.

Other objects and advantages will be apparent from the following description of one embodiment of the invention and the novel features will be particularly pointed out hereinafter in connection with the appended claim.

In the accompanying drawings:

FIG. 1 is an end elevation of the headstock of a lathe having a cut off mechanism embodying this invention applied thereto.

FIG. 2 is a sectional plan view thereof on line 2—2, FIG. 1.

FIG. 3 is a central sectional elevation thereof on line 3—3, FIG. 1.

FIG. 4 is a fragmentary sectional view thereof on line 4—4, FIG. 1.

FIG. 5 is a fragmentary sectional view thereof on an enlarged scale on line 5—5, FIG. 1.

FIG. 6 is a fragmentary sectional view thereof on line 6—6, FIG. 1.

In the drawings, I have shown the invention applied to a lathe but it will be understood that this improved cut-off tool may equally well be used in connection with any other machine in which the work is rotated. In the accompanying drawings, 10 represents the headstock housing of a lathe having a front cap 11 from which projects a spindle nose 15 within which is arranged the usual collet or work gripping chuck 12. 14 represents the work which is gripped by the collet and rotated by suitable mechanism (not shown). The headstocks of lathes are usually provided with forwardly projecting parts, such as the spindle nose 15 shown in the drawing, which may be rigidly secured to or formed integral with the headstock housing.

In accordance with this invention, the cut-off mechanism is preferably supported directly on the headstock, for example, by mounting the same on the forwardly projecting part or cap 11, since in this way the bed of the lathe is left free and unobstructed for use by other attachments or lathe accessories.

The mounting of the cut-off mechanism on the headstock depends upon the particular machine to which the mechanism is to be applied, and by way of example, the mounting shown in the drawing includes a ring shaped part 17 which extends about the front cap 11 and is secured thereto by means of bolts or screws 18.

The ring shaped part 17 has an upwardly extending integral frame member 20 on which the various parts of the cut-off mechanism are mounted. This frame member has a tool supporting slide 21 mounted thereon which may be slidably mounted on the frame member 20 in any suitable manner. For example, in the construction illustrated, the frame 20 has an under-cut or dove-tailed groove formed therein and the slide 21 is provided with a corresponding projection 22 slidably mounted in the groove in any usual or suitable manner. A gib 23 may be provided to take up any looseness or play in this sliding connection.

This slide 21 may be moved toward and from the work 14 by any suitable mechanism and in the construction shown for this purpose a crank 24 mounted on a stud shaft 25 is employed for this purpose. The shaft 25 is rotatably mounted on the frame member 20 and on a laterally extending hub 26 formed integral therewith. The shaft 25 may be turned by means of a handle 28 of any suitable form. Preferably the shaft is provided with a groove 30 extending partly about a peripheral portion thereof and a set screw 31 extending through a threaded hole in the frame member 20 has its inner end projecting into this groove for the two-fold purpose of confining the shaft 25 against axial movement and for limiting the extent to which the shaft may be turned by engaging the ends of the peripheral groove 30. The crank member 24 may be in the form of a sleeve mounted by a suitable anti-friction bearing on a pin secured to the end of the shaft 25.

The crank 24 extends into a groove or slot 33 formed in the tool supporting slide 21. Consequently when the handle 28 is swung to turn the shaft 25, the crank 24 will cause the slide 21 to move substantially vertically relative to the frame member 20.

35 represents a cutting tool which in the construction shown is in the nature of a cut-off tool, but which may be formed for producing any other cut in the work 14. This tool is mounted in a slot 36 formed in that face of a tool carrying member 37 which is adjacent to the slide 21.

In order to enable the tool to make a cut in the work without chattering or vibrating, it is necessary to provide a very rigid support for the tool on the tool carrier 37, and it is also necessary to support the tool so that it is in correct relation to the work. The securing of the tool rigidly on the tool carrier is effected by means of a pair of clamping screws 40 and 41 which engage in threaded holes in the tool carrier 37, and these screws are also provided at their ends with eccentrics or cams 42 which extend into position to engage an edge portion of the tool 35, the two screws being spaced apart lengthwise of the tool to securely press the opposite edge of the tool against a wall 43 of the recess 36. It will also be noted that the eccentrics 42 are slightly beveled or undercut at a small angle, as best shown in FIG. 6, so that these undercut surfaces of the eccentrics will draw the tool against the shoulder of the tool holder. The directions for locking the cutting tool on its holder also instruct the operator to turn the screw to the left for tightening the tool. Since the screws have right hand threads, they will be to a very slight extent withdrawn from the tool holder and this will further draw the tool against its holder. These eccentrics serve the additional purposes of securely pressing the tool against the wall 43 of the recess so as to prevent any looseness or vibration of the tool relatively to its carrier, and the eccentrics also serve to lock the screws 40 and 41 in the positions into which they are set. It will be noted that the cutting tool is so shaped that its sides are flat and parallel and relieved back of the cutting edges, so that one side of the tool bears only on a flat surface of the holder, the groove 36 of which is relieved to receive the enlarged cutting edge of the tool.

The adjusting of the tool in the direction of its length can, of course, be taken care of by loosening the screws 40 and 41 and manually moving the tool 35 into position. The adjusting of the cutting edge of the tool laterally relatively to the work is preferably effected by pivotally mounting the upper portion of the tool carrier 37 on the slide 21. In the construction shown for this purpose this is accomplished by means of a pivot member 45 which in the construction shown is in the form of a screw provided with a head and a shank which fit into a correspondingly formed hole in the tool carrier 37, the end of the pivot screw being threaded and engaging in a threaded hole formed in the slide 21.

The adjusting of the tool carrier 37 relatively to the slide 21 about the axis of the pivot screw 45 and the securing of the same in adjusted position may be effected in any desired manner but preferably the following means are provided for this purpose. The slide 21 is provided with an abutment screw 46 having a threaded engagement with the slide and having a head portion 47 which extends through an enlarged hole or opening 48 formed in the tool carrier 37. This opening 48 is of sufficient size to permit the adjustment of the tool carrier 37 about its pivot pin 45 to the maximum extent necessary. The adjustment of the tool carrier about its pivot pin may be effected by means of a pair of set screws 50 and 51 which have a threaded engagement in a hole 52 formed in a tool carrier. The ends of these screws extend into engagement with the head 47 of the abutment screw and consequently by adjusting the screws 50 and 51 relatively to the abutment screw 47, the tool carrier may be moved into the desired position about its pivot screw 45 and by tightening these adjusting screws, they will be securely held in the positions in which they are set.

In the use of the mechanism described, the tool 35 is first adjusted lengthwise in the tool carrier as may be required for the cut to be made. The tool 35 is then adjusted in a direction transverse of its length about the pivot screw 45 by means of the adjusting screws 50 and 51 engaging the abutment screw 47. Screws 47 and 45 are then tightened to clamp the tool carrier 37 to the slide 21 securely so that there will be no looseness or lost motion which might result in a chattering or vibration when a cut is made. The mechanism is then ready for use and when a cut is to be made in the work 14, it is merely necessary to swing the handle 28 so that the crank 33 moves the slide 21 downwardly toward the work. The swinging of the handle 28 back into its inoperative position is controlled by the length of the groove 30 formed in the shaft 25 and preferably this groove is of such length that the handle 28 when in its inoperative position will be back of its dead center position so that it will remain in its inoperative position without requiring any detent or locking means.

60 represents an annular splash guard which may be held in place by a press fit against an annular face 61 of the ring shaped part 17 of the frame of the cut-off mechanism. This splash guard does not touch any rotating part of the machine and has an opening 62 through which coolant may blow. A portion of the flange of the splash guard seats against a shoulder formed on the part 17 of the supporting frame of the cut-off mechanism.

It will be understood that various changes in the details, materials and arrangements of parts which have been herein described and illustrated in order to explain the nature of the invention, may be made by those skilled in the art within the principle and scope of the invention, as expressed in the appended claim.

We claim:

A mechanism mountable on the headstock of a machine for cutting work while rotated on the machine, including a supporting frame having parts engaging said headstock for supporting said mechanism thereon, a slide mounted on said supporting frame, guide means on said frame for controlling the direction of movement of said slide toward and from the work, a tool holder provided with means for securing a cutting tool thereto, means for adjusting the position of said tool holder relatively to said slide for presenting said tool holder in the desired angular relation to the work, and means for moving said slide toward and from the work for cutting the same, said last mentioned means including a shaft journalled in said frame and a crank on said shaft, said slide having a slot into which said crank extends for moving said slide when said shaft is turned, a slot in said shaft extending partly about the periphery of said shaft and a stop part on said frame extending into said slot to limit the extent of movement of said shaft relatively to said frame.

References Cited in the file of this patent

UNITED STATES PATENTS

| | | |
|---|---|---|
| 1,222,178 | Browand | Apr. 10, 1917 |
| 1,858,754 | Tessky | May 17, 1932 |
| 2,041,251 | Klein | May 6, 1935 |
| 2,223,831 | Luers | Dec. 3, 1940 |
| 2,293,006 | Luers | Aug. 11, 1942 |
| 2,313,558 | Kuehn | Mar. 9, 1943 |
| 2,315,899 | Kuehn | Apr. 6, 1943 |
| 2,326,467 | Kuehn | Aug. 10, 1943 |
| 2,368,794 | Wilson | Feb. 6, 1945 |
| 2,410,355 | Nesbitt et al. | Oct. 29, 1946 |
| 2,458,244 | Bohl | Jan. 4, 1949 |
| 2,491,571 | McCready | Dec. 20, 1949 |
| 2,621,522 | Miller | Dec. 16, 1952 |
| 2,643,717 | Mazar | June 30, 1953 |
| 2,711,904 | Gartner | June 28, 1955 |
| 2,737,705 | Novkov | Mar. 13, 1956 |